Oct. 26, 1937.                   S. A. PLATT                   2,096,940
HANDLE FOR IMPLEMENTS, UTENSILS, AND THE LIKE, AND METHOD OF MAKING THE SAME
Filed March 10, 1936
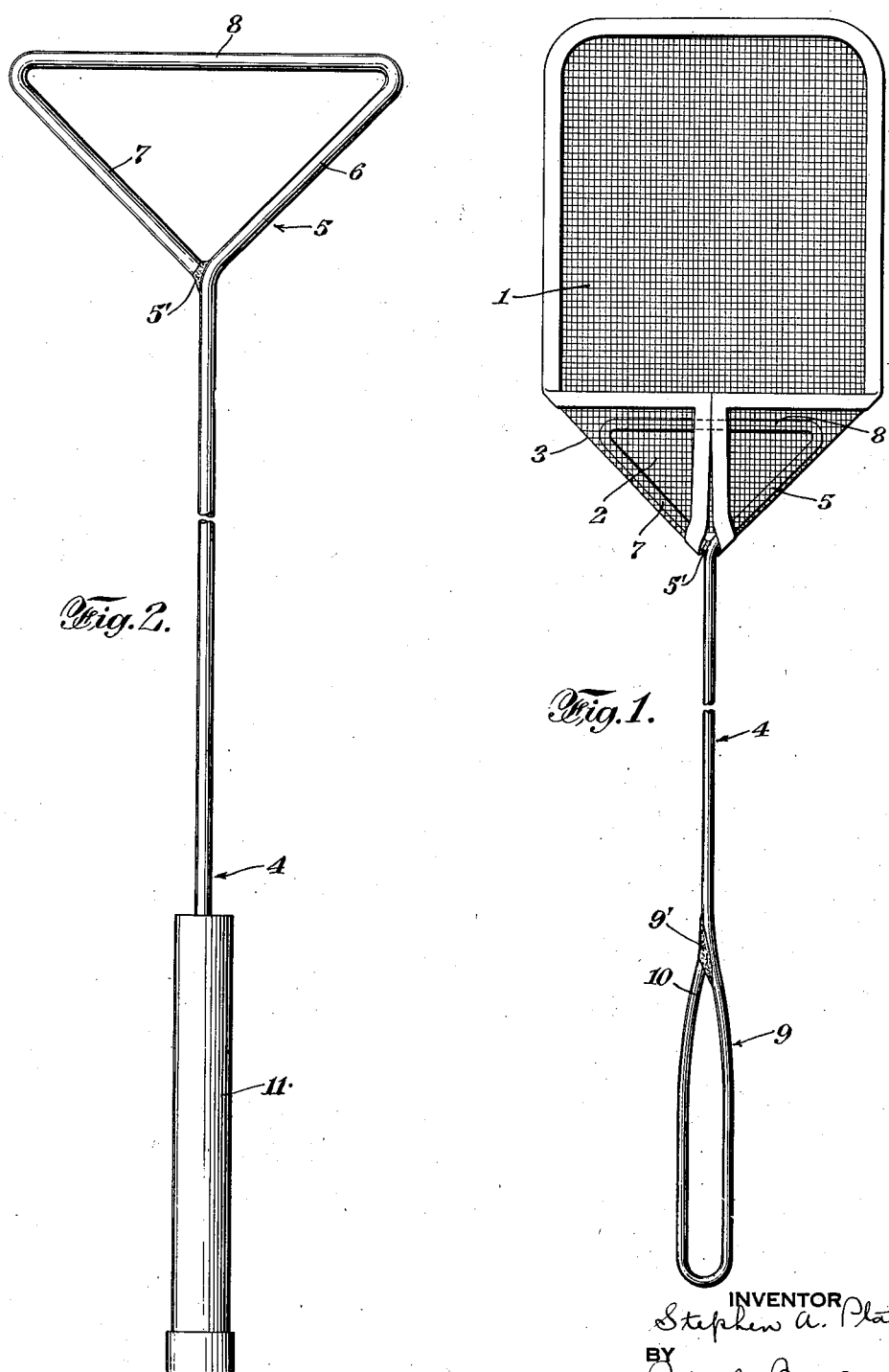

Patented Oct. 26, 1937

2,096,940

UNITED STATES PATENT OFFICE 2,096,940

HANDLE FOR IMPLEMENTS, UTENSILS, AND THE LIKE AND METHOD OF MAKING THE SAME

Stephen A. Platt, Decatur, Ill., assignor to U. S. Manufacturing Corporation, Decatur, Ill., a corporation of Illinois Application March 10, 1936, Serial No. 68,048

3 Claims. (Cl. 140—71)

This invention relates to handle constructions and method of making the same, which handle constructions are particularly adapted for use in connection with implements and utensils which require a substantial handle length, and the principal object of this invention is the provision of a handle which is simple in construction, attractive in appearance and easy and cheap to manufacture. It is also strong in construction and will have a long life and also lends itself readily to the use of the proper material where resiliency is a desirable factor or feature of the handle to be used.

To the accomplishment of the foregoing and such other objects as may hereinafter appear, this invention consists in the construction, combination and arrangement of parts hereinafter described and then sought to be defined in the appended claims, reference being had to the accompanying drawing forming a part hereof and which shows, merely for the purpose of illustrative disclosure, a preferred embodiment of my invention, it being expressly understood, however, that various changes may be made in practice within the scope of the claims without digressing from my inventive idea.

In the drawing—

Fig. 1 represents a side elevation of a fly swatter showing one form of handle constructed to embody my invention;

Fig. 2 is a side elevation of a handle member per se, with a gripping element attached, showing a slightly modified form.

In each of the modifications it is obvious that the handle element itself is composed of one piece and that it is preferably made of a suitable wire or rod, so that if resiliency is desired, the proper kind of material may be used.

Referring first to the construction illustrated in Fig. 1 of the drawing, the numeral 1 designates the body or flap of a standard form of fly swatter. This body or flap 1 is substantially rectangular in shape with its lower corner portions 2 folding along lines 3 which converge to a point at the center or middle of the lower edge of the rectangular body. The folding of these parts form a triangular pocket which is adapted to receive a similar shaped element or member which is formed on the end of the handle element.

This handle element is designated generally by the reference character 4 and is composed of a suitable wire or rod or other material which has sufficient strength to provide as long a handle element as may be desired. The upper portion of this handle element is bent in the form of a triangular loop 5 having the two angular extending side portions 6 and 7 and the top horizontal portion 8. As previously stated, this triangular loop is of substantially the same dimension as the triangular pocket formed in the lower part of the fly swatter body and the diverging sides 6 and 7 of the loop extend parallel to the lines on which the lower corner portions of the fly swatter body are folded so as to afford a good fit and secure anchorage when the customary securing means in the form of staples, stitching and the like is used.

The free end of the triangular loop which in the beginning of the formation of the handle constitutes the upper end of the handle element, is secured to the body of the handle element at the beginning of the triangular loop by welding or other suitable means, as at 5'.

The lower end of the handle element shown in Fig. 1 is bent to form an elongated gripping loop 9 having parallel sides and with the originally lower end 10 of the wire or rod forming the gripping element bent into proximity to the bend in the gripping element at the beginning of the loop. This end 10 is secured to the body of the gripping element at the beginning of the loop by welding or any other suitable means, as at 9'.

The construction of handle shown in Fig. 2 is substantially the same as that shown in Fig. 1, with the exception of the gripping element end of the same. In this form of construction, instead of using the integral loop 10, a separate gripping element 11 is used. The handle element 4 has its lower end inserted into and secured within this gripping element 11 by anyone of a number of constructions.

It is seen that in both forms the handle element itself is composed of one piece wherein the triangular securing loop is formed as an integral portion of the upper part of the handle element and is formed of such a construction as to be strong and solid. This statement also applies to the lower end of the handle element where the gripping element 9 is provided, as in Fig. 1.

These handle members are very readily made in the factory and their formation merely involves the bending of one end of the required length of material into the form of a triangular loop and then welding the free end of this triangular loop to the body of the handle element at the beginning or apex of the triangular loop. At the same time the gripping loop may be bent into the form shown in Fig. 1 and the free end of that part of the handle welded or otherwise secured to the handle element at the beginning of the loop. This results in the formation of a one-piece integral construction of handle member or element which, while especially designed for implements such as fly swatters or the like, may be used in connection with various forms of implements and utensils.

What I claim is:

1. The method of making handles for implements, utensils and the like, which includes bending one end of a suitable length of wire or rod into the form of an open triangular loop and permanently securing the free end of the open triangular loop to the body of the handle at the beginning or apex of the triangular loop by welding and bending the other end of the wire or rod into a gripping loop and securing the free end of this part of the wire or rod to the handle body at a different point of the said body than said first named free end by welding whereby the said handle body constitutes but a single length of said wire or rod.

2. A handle for an implement, utensil and the like, composed of a suitable length of rod having one end bent into the form of a triangular loop with the free end thereof terminating at and permanently secured to the body of the handle at the apex of said triangular loop, and having the other end of said rod bent into the form of an open loop spaced from said triangular loop by said handle body and having spaced parallely extending portions providing a gripping element, the free end of said other end of the rod terminating at and being permanently secured to the body of the handle at the beginning of the gripping loop whereby an integral handle construction is provided which includes a handle body comprising a single length of said rod, a gripping loop at one end of said body and a securing loop at the other end of said body by which said handle is connected to the utensil or implement, the said loops being co-planar.

3. A method of forming a handle for an implement, utensil and the like comprising bending one end portion of a straight rod outwardly at an angle to the axis of the rod to form one leg of a triangular loop, bending the portion between said first named bend and the free end of said rod toward and normal to said axis to form the base of said loop, bending the portion between said second bend and said free end toward said rod, to complete said triangular loop, welding said free end to said rod at said first named bend, bending the other end portion of said rod to form a substantially rectangular loop and welding the free end of said other end portion to said rod at a point substantially distant from said first named free end, the said bending operation being so performed that said loops are co-planar and symmetrically disposed with respect to the said axis of said rod.

STEPHEN A. PLATT.